(12) United States Patent
Sugiyama et al.

(10) Patent No.: US 8,791,218 B2
(45) Date of Patent: Jul. 29, 2014

(54) WATER/OIL REPELLENT COMPOSITION, METHOD FOR PRODUCTION THEREOF, AND ARTICLE

(75) Inventors: Kazunori Sugiyama, Chiyoda-ku (JP); Kyouichi Kaneko, Chiyoda-ku (JP); Yuuichi Oomori, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 943 days.

(21) Appl. No.: 12/607,134

(22) Filed: Oct. 28, 2009

(65) Prior Publication Data

US 2010/0048846 A1 Feb. 25, 2010

Related U.S. Application Data

(63) Continuation of application No. PCT/JP2008/060703, filed on Jun. 11, 2008.

(30) Foreign Application Priority Data

Jun. 12, 2007 (JP) ................................ 2007-155450

(51) Int. Cl.
*C08F 16/24* (2006.01)

(52) U.S. Cl.
USPC ........... 526/247; 524/755; 524/765; 524/773; 524/801

(58) Field of Classification Search
USPC .................... 526/247; 524/755, 765, 773, 801
See application file for complete search history.

(56) References Cited

U.S. PATENT DOCUMENTS

| | | | | |
|---|---|---|---|---|
| 5,688,309 A | * | 11/1997 | Shimada et al. | .................... 106/2 |
| 5,876,617 A | * | 3/1999 | Sato et al. | ..................... 252/8.62 |
| 6,590,035 B2 | * | 7/2003 | Shimada et al. | .............. 525/199 |
| 7,446,145 B2 | | 11/2008 | Hashimoto et al. | |
| 7,485,688 B2 | * | 2/2009 | Maekawa et al. | ............. 526/245 |
| 7,989,567 B2 | * | 8/2011 | Sugiyama et al. | ............ 526/224 |
| 2003/0130457 A1 | | 7/2003 | Maekawa et al. | |
| 2007/0293654 A1 | | 12/2007 | Kashiwagi | |
| 2008/0188606 A1 | | 8/2008 | Asada et al. | |
| 2009/0085001 A1 | | 4/2009 | Furuta et al. | |

FOREIGN PATENT DOCUMENTS

| | | |
|---|---|---|
| EP | 1 298 180 A1 | 4/2003 |
| EP | 1298180 A1 * | 4/2003 |
| EP | 1 788 047 A1 | 5/2007 |
| EP | 1788047 A1 * | 5/2007 |
| JP | 62-138579 | 6/1987 |
| JP | 05-214198 | 8/1993 |
| JP | 11-092752 | 4/1999 |
| WO | 02-083809 | 10/2002 |
| WO | 2004-035708 | 4/2004 |
| WO | 2005-090423 | 9/2005 |
| WO | 2006-022122 | 3/2006 |

OTHER PUBLICATIONS

U.S. Appl. No. 12/570,893, filed Sep. 30, 2009, Shimada, et al.
U.S. Appl. No. 12/555,377, filed Sep. 8, 2009, Shimada, et al.
U.S. Appl. No. 12/731,489, filed Mar. 25, 2010, Sugiyama, et al.
Extended European Search Report issued Apr. 26, 2011, in Application No. / Patent No. 08765482.8-2124 / 2166059 PCT/JP2008060703.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide a water/oil repellent composition which can impart water/oil repellency to a surface of an article without having its texture deteriorated, and has excellent durability against washing and stability, a method for producing such a composition, and an article treated with such a water/oil repellent composition. A water/oil repellent composition which comprises a copolymer having polymerized units derived from monomer (a), polymerized units derived from monomer (b) and polymerized units derived from monomer (c). Here, monomer (a) is a compound represented by the formula: $(Z-Y)_n X$; wherein $Z$ is a $C_{1-6}$ perfluoroalkyl group or the like; $Y$ is a bivalent organic group or a single bond; $n$ is 1 or 2; and $X$ is a polymerizable unsaturated group; monomer (b) is a (meth)acrylate having no $R^f$ group and having a $C_{12-18}$ alkyl group; and monomer (c) is monomer (c1) having no $R^f$ group and having a blocked isocyanate group or monomer (c2) having no $R^f$ group and having at least two polymerizable unsaturated groups.

17 Claims, No Drawings

WATER/OIL REPELLENT COMPOSITION, METHOD FOR PRODUCTION THEREOF, AND ARTICLE

TECHNICAL FIELD

The present invention relates to a water/oil repellent composition, a method for production thereof, and an article treated with such a water/oil repellent composition.

BACKGROUND ART

A method of treating an article with a water/oil repellent composition which comprises an emulsion having, dispersed in a medium, a copolymer comprising polymerized units derived from a monomer having a polyfluoroalkyl group (hereinafter referred to as a $R^f$ group, in the present invention) is known as a method for imparting water/and oil repellency to a surface of the article (e.g. a fiber product). Such a water/oil repellent composition is required not to lose the water/oil repellency substantially even when repeatedly subjected to washing (durability against washing).

As a water/oil repellent composition with excellent water/oil repellency, the following water/oil repellent compositions have, for example, been proposed:

(1) a water/oil repellent composition containing a copolymer as an indispensable component, which consists essentially of polymerized units derived from the following monomer (a) and the following monomer (b) (Patent Document 1):

monomer (a): a monomer having a $C_{1-6}$ perfluoroalkyl group (hereinafter referred to as a $R^F$ group, in the present invention), etc.;

monomer (b): a (meth)acrylate having an alkyl group having at least 15 carbon atoms, etc.;

(2) a water/oil repellent composition containing a copolymer, as an indispensable component, which contains polymerized units derived from the following monomer (a) and the following monomer (b) in an amount of at least 30 mass % and less than 80 mass % and further contains polymerized units derived from the following monomer (c) (Patent Document 2):

monomer (a): a monomer having a $C_{1-6}R^F$ group, etc.;

monomer (b): a monomer having no $R^f$ group and having a cross-linkable functional group;

monomer (c): at least one monomer having no $R^f$ group (excluding monomer (b)), which contains the following monomer (c1) or (c2) in an amount of at least 50 mass % based on the total amount of monomer (c):

monomer (c1): a (meth)acrylate having a $C_{16-40}$ alkyl group, etc.; and monomer (c2): a monomer, of which the homopolymer has a glass transition point of from −50° C. to 40° C. (excluding monomer (c1)).

However, fiber products etc. treated with the water/oil repellent composition (1) or (2) have a problem such that their flexibility is insufficient and their texture is likely to be deteriorated. Additionally, when the water/oil repellent composition (1) or (2) is vigorously stirred, or foreign substances (such as dyestuffs) are added thereto, the emulsion of the composition tends to be unstable. Therefore, a water/oil repellent composition having mechanical stability and stability to foreign substances is desired.

Patent Document 1: WO02/083809
Patent Document 2: WO2004/035708

DISCLOSURE OF THE INVENTION

Object to be Accomplished by the Invention

The present invention is to provide a water/oil repellent composition which can impart water/oil repellency to a surface of an article without having its texture deteriorated, and has excellent durability against washing, mechanical stability and stability to foreign substances, a method for its production, and an article which has water/oil repellency, is less susceptible to deterioration of the water/oil repellency by washing, and has a excellent texture.

Means to Accomplish the Object

The water/oil repellent composition of the present invention is characterized in that it comprises a copolymer having from 40 to 60 mass % of polymerized units derived from the following monomer (a), from 25 to 59.9 mass % of polymerized units derived from the following monomer (b), and from 0.1 to 15 mass % of polymerized units derived from the following monomer (c):

monomer (a): a compound of the following formula (1):

$$(Z-Y)_n X \tag{1}$$

wherein Z is a $C_{1-6}R^F$ group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2:

$$C_i F_{2i+1} O(CFX^1 CF_2 O)_j CFX^2— \tag{2}$$

wherein i is an integer of from 1 to 6, j is an integer of from 0 to 10, and each of $X^1$ and $X^2$ which are independent of each other, is a fluorine atom or a trifluoromethyl group;

$$—CR=CH_2 \tag{3-1}$$

$$—COOCR=CH_2 \tag{3-2}$$

$$—OCOCR=CH_2 \tag{3-3}$$

$$—OCH_2-\phi-CR=CH_2 \tag{3-4}$$

$$—OCH=CH_2 \tag{3-5}$$

wherein R is a hydrogen atom, a methyl group or a halogen atom, and $\phi$ is a phenylene group;

$$—CH[—(CH_2)_m CR=CH_2]— \tag{4-1}$$

$$—CH[—(CH_2)_m COOCR=CH_2]— \tag{4-2}$$

$$—CH[—(CH_2)_m OCOCR=CH_2]— \tag{4-3}$$

$$—OCOCH=CHCOO— \tag{4-4}$$

wherein R is a hydrogen atom, a methyl group or a halogen atom, and m is an integer of from 0 to 4;

monomer (b): a (meth)acrylate having no $R^f$ group and having a $C_{12-18}$ alkyl group; and monomer (c): the following monomer (c1) and/or the following monomer (c2):

monomer (c1): a monomer having no polyfluoroalkyl group and having a blocked isocyanate group;

monomer (c2): a monomer having no polyfluoroalkyl group and having at least two polymerizable unsaturated groups (excluding monomer (c1)).

The above copolymer preferably contains polymerized units derived from the above monomer (c1) and polymerized units derived from the above monomer (c2).

The compound of the formula (1) is preferably one wherein Z is a $C_{1-6}R^F$ group, Y is a $C_{1-4}$ alkylene group, n is 1, and X is a group of the formula (3-3).

The article of the present invention is an article treated with the water/oil repellent composition of the present invention.

The method of this invention for producing a water/oil repellent composition is characterized in that a monomer mixture comprising from 40 to 60 mass % of the monomer (a), from 25 to 59.9 mass % of the monomer (b) and from 0.1 to 15 mass % of the monomer (c) is polymerized in a medium in the presence of a surfactant and a polymerization initiator.

The above monomer mixture preferably contains the monomer (c1) and the monomer (c2).

The compound of the formula (1) is preferably one wherein Z is a $C_{1-6}R^F$ group, Y is a $C_{1-4}$ alkylene group, n is 1, and X is a group of the formula (3-3).

Effects of the Invention

The water/oil repellent composition of the present invention comprises the monomer (a) and the monomer (b) in a specific ratio, whereby water/oil repellency can be imparted to the surface of an article without having its texture deteriorated. It additionally contains the monomer (c1) having a blocked isocyanate group and/or the monomer (c2) having no $R^f$ group and having at least two polymerizable unsaturated groups as polymerized units derived from the monomer (c), whereby it is possible to improve its durability against washing, mechanical stability and stability to foreign substances.

By the method of the present invention for producing a water/oil repellent composition, it is possible to produce a water/oil repellent composition which can impart water/oil repellency to the surface of an article without having its texture deteriorated and has excellent durability against washing, mechanical stability and stability to foreign substances.

The article of the present invention has water/oil repellency, is less susceptible to deterioration of the water/oil repellency by washing and has a good texture.

BEST MODE FOR CARRYING OUT THE INVENTION

In this specification, a compound represented by the formula (1) is referred to as compound (1). The same applies to compounds represented by other formulae. And, in this specification, a group represented by the formula (2) is referred to as group (2). The same applies to groups represented by in other formulae. And, a (meth)acrylate in this specification means an acrylate or a methacrylate. And, a monomer in this specification means a compound having a polymerizable unsaturated group.

<Water/Oil Repellent Composition>

The water/oil repellent composition of the present invention contains the copolymer as an indispensable component, and also contains a medium, a surfactant and an additive, as the case requires.

(Copolymer)

The copolymer comprises polymerized units derived from monomer (a), polymerized units derived from monomer (b) and polymerized units derived from monomer (c), as indispensable units, and, if necessary also contains polymerized units derived from monomer (d).

Monomer (a):

Monomer (a) is compound (1):

$$(Z-Y)_nX \quad (1)$$

wherein Z is a $C_{1-6}R^F$ group or group (2):

$$C_iF_{2i+1}O(CFX^1CF_2O)_jCFX^2- \quad (2)$$

wherein i is an integer of from 1 to 6, j is an integer of from 0 to 10, and each of $X^1$ and $X^2$ which are independent of each other, is a fluorine atom or a trifluoromethyl group.

The number of carbon atoms in the $R^F$ group is preferably from 4 to 6. The $R^F$ group may have a straight chain structure or branched structure, preferably a straight chain structure.

The following groups may be mentioned as examples of Z:
$F(CF_2)_4-$,
$F(CF_2)_5-$,
$F(CF_2)_6-$,
$(CF_3)_2CF(CF_2)_2-$,
$C_kF_{2k+1}O[CF(CF_3)CF_2O]_h-CF(CF_3)-$, etc.:
wherein k is an integer of from 1 to 6, and h is an integer of from 0 to 10.

Y is a bivalent organic group or a single bond.

The bivalent organic group is preferably an alkylene group. The alkylene group may have a straight chain structure or branched structure. The alkylene group may have $-O-$, $-NH-$, $-CO-$, $-SO_2-$, $-CD^1=CD^2-$ (wherein each of $D^1$ and $D^2$ which are independent of each other, is a hydrogen atom or a methyl group), etc.

The following groups may be mentioned as examples of Y:
$-CH_2-$,
$-CH_2CH_2-$,
$-(CH_2)_3-$,
$-CH_2CH_2CH(CH_3)-$,
$-CH=CH-CH_2-$, etc.

n is 1 or 2.

X is one of groups (3-1) to (3-5) when n is 1, and one of groups (4-1) to (4-4) when n is 2;

$$-CR=CH_2 \quad (3\text{-}1)$$

$$-COOCR=CH_2 \quad (3\text{-}2)$$

$$-OCOCR=CH_2 \quad (3\text{-}3)$$

$$-OCH_2\text{-}\phi\text{-}CR=CH_2 \quad (3\text{-}4)$$

$$-OCH=CH_2 \quad (3\text{-}5)$$

wherein R is a hydrogen atom, a methyl group or a halogen atom, and $\phi$ is a phenylene group;

$$-CH[-(CH_2)_mCR=CH_2]- \quad (4\text{-}1)$$

$$-CH[-(CH_2)_mCOOCR=CH_2]- \quad (4\text{-}2)$$

$$-CH[-(CH_2)_mOCOCR=CH_2]- \quad (4\text{-}3)$$

$$-OC(O)CH=CHCOO- \quad (4\text{-}4)$$

wherein R is a hydrogen atom, a methyl group or a halogen atom, and m is an integer of from 0 to 4.

From a viewpoint of the polymerizability with other monomers, flexibility of a film of the copolymer, adherence property of the copolymer to an article, solubility in a medium, ease of emulsion polymerization, etc., compound (I) is preferably a (meth)acrylate having a $C_{1-6}R^F$ group, further preferably a methacrylate having a $C_{1-6}R^F$ group, particularly preferably a methacrylate having a $C_{4-6}R^F$ group. Compound (I) is preferably one wherein Z is a $C_{1-6}R^F$ group, Y is a $C_{1-4}$ alkylene group, n is 1, and X is a group of the formula (3-3).

Monomer (b):

Monomer (b) is a (meth)acrylate having no $R^f$ group and having a $C_{12-18}$ alkyl group.

The copolymer has polymerized units derived from the monomer (b), whereby the texture of an article can be improved.

When the number of carbon atoms in the alkyl group is at least 12, a water/oil repellent composition has good water repellency. When the number of carbon atoms in the alkyl group is at most 18, a water/oil repellent composition has good property of air drying. The number of carbon atoms of the alkyl group is preferably from 16 to 18.

Monomer (b) is preferably stearyl (meth)acrylate, more preferably stearyl acrylate.

Monomer (c):

Monomer (c) is monomer (c1) and/or monomer (c2).

The copolymer contains polymerized units derived from monomer (c), whereby it is possible to improve durability against washing of the water/oil repellent composition.

Monomer (c) is preferably monomer (c1) from the viewpoint of durability against washing. When it is used with monomer (c2), stability of processing solution is improved. Because stability to acidic dyestuffs is particularly improved, (c1) and (c2) are preferably used together.

Monomer (c1):

Monomer (c1) is a monomer having no F group and having a blocked isocyanate group.

Monomer (c1) is preferably obtained by having a blocked isocyanate group reacted with a compound containing an active hydrogen group and making it inactivated at ordinary temperature.

Monomer (c1) is preferably a (meth)acrylate, more preferably a (meth)acrylate having an isocyanate group blocked by a blocking agent.

The (meth)acrylate having an isocyanate group is preferably 2-isocyanatoethyl (meth)acrylate or a product obtained by having a (meth)acrylate having a functional group combinable with an isocyanate group reacted with a polyisocyanate so that at least one isocyanate group remains.

The (meth)acrylate having a functional group combinable with an isocyanate group is preferably a (meth)acrylate having a hydroxy group, more preferably monoester or diester of (meth)acrylic acid and a multiple alcohol.

The multiple alcohol is preferably ethylene glycol, polyethylene glycol, propylene glycol, polyoxypropylene glycol, glycerin, a trimethylolpropane-alkylene oxide adduct or pentaerythritol.

The polyisocyanate is preferably an aliphatic polyisocyanate. The aliphatic polyisocyanate is preferably hexamethylene diisocyanate, isohoron diisocyanate, 4,4'-dicyclohexylmethane diisocyanate, cyclohexylene diisocyanate, norbornene diisocyanate, a modified product of such an aliphatic polyisocyanate (such as an isocyanurate modified product, a prepolymer type modified product or a bullet modified product), or a dimer or a trimer of an aliphatic polyisocyanate, particularly preferably an aliphatic polyisocyanate, an isosyanurate modified product thereof, a prepolymer type modified product thereof or a bullet modified product thereof.

The blocking agent is preferably an alkyl ketoxime, a phenol, an alcohol, β-diketone, a lactam, an amine or a pyrazole, more preferably methylethylketoxime, ε-caprolactam, phenol, cresol, acetylacetone, diethyl malonate, isopropyl alcohol, t-butyl alcohol, 3,5-dimethylpyrazole or maleimide, further preferably an alkyl ketoxime such as methylethylketoxime, a lactam such as ε-caprolactam or a pyrazole such as 3,5-dimethylpyrazole, particularly preferably a blocking agent having a dissociation temperature of from 100 to 180° C.

The following compounds may be mentioned as examples of monomer (c1):

2-isocyanatoethyl (meth)acrylate, 3-isocyanatopropyl (meth)acrylate, 4-isocyanatobutyl (meth)acrylate, a 2-butanone oxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanone oxime adduct of 3-isocyanatopropyl (meth)acrylate, and a pyrazole adduct of 3-isocyanatopropyl (meth)acrylate;

a 3,5-dimethylpyrazole adduct of 3-isocyanatopropyl (meth)acrylate, a 3-methylpyrazole adduct of 3-isocyanatopropyl (meth)acrylate, an ε-caprolactam adduct of 3-isocyanatopropyl (meth)acrylate, a 2-butanone oxime adduct of 4-isocyanatobutyl (meth)acrylate, a pyrazole adduct of 4-isocyanatobutyl (meth)acrylate, a 3,5-dimethylpyrazole adduct of 4-isocyanatobutyl (meth)acrylate, a 3-methylpyrazole adduct of 4-isocyanatobutyl (meth)acrylate, and an ε-caprolactam adduct of 4-isocyanatobutyl (meth)acrylate; and 3-(2-butanoneoxime)isocyanatomethyl-3,5,5-trimethylcyclohexyl(2-hydroxyethylmethacrylate)cyanate (e.g. TECHCOAT HE6P, manufactured by Kyoken Kasei).

Monomer (c1) is preferably a 3,5-dimethylpyrazole adduct of 2-isocyanatoethyl (meth)acrylate or 3-(2-butanoneoxime) isocyanatomethyl-3,5,5-trimethylcyclohexyl(2-hydroxyethylmethacrylate)cyanate.

Monomer (c2):

Monomer (c2) is a monomer having no $R^f$ group and having at least two polymerizable unsaturated groups (excluding monomer (c1)).

Monomer (c2) is preferably a (meth)acrylate, a vinyl ether, a vinyl ester, an allyl or an allyl ether.

The following compounds may be mentioned as examples of monomer (c2):

Allyl (meth)acrylate, ethylene glycol di(meth)acrylate, propylene glycol di(meth)acrylate, diethylene glycol di(meth)acrylate, dipropylene glycol di(meth)acrylate, polyethylene glycol di(meth)acrylate, polypropylene glycol di(meth)acrylate, polyoxyethylene glycol di(meth)acrylate, and polyoxypropylene glycol di(meth)acrylate;

Trimethylolpropane tri(meth)acrylate, pentaerythritol tri (meth)acrylate, pentaerythritol tetra(meth)acrylate, ditrimethylolpropane tetra(meth)acrylate, and dipentaerythritol hexa(meth)acrylate; and Tri(meth)allyl isocyanurate (T(M)AIC, manufactured by Nippon Kasei Chemical Co., Ltd.), triallyl cyanurate (TAC, manufactured by Nippon Kasei Chemical Co., Ltd.), and phenylglycidylethylacrylate tolylenediisocyanate (AT600, KYOEISHA CHEMICAL Co., Ltd.).

Monomer (c2) is preferably tri(meth)allyl isocyanurate, triallyl cyanurate or phenylglycidylethylacrylate tolylenediisocyanate.

When monomer (c1) and monomer (c2) are used together, the ratio of monomer (c1) to monomer (c2) (monomer (c1)/monomer (c2)) is preferably from 1/40 to 40/1 (mass ratio).

When monomer (c1) and monomer (c2) are used together, it is particularly preferred that monomer (c1) is a 3,5-dimethylpyrazole adduct of 2-isocyanatoethyl (meth)acrylate and monomer (c2) is triallyl cyanurate.

Monomer (d):

The copolymer may contain monomer (d) for the purpose of improving adhesion to a material and film forming property, and keeping the texture of an article and water repellency.

Monomer (d) is a monomer other than monomer (a), monomer (b) or monomer (c).

The following compounds may be mentioned as example of monomer (d):

Methyl acrylate, ethyl acrylate, propyl acrylate, butyl methacrylate, cyclohexyl (meth)acrylate, 2-ethylhexyl (meth)acrylate, butyl methacrylate, n-hexyl (meth)acrylate, vinyl acetate, vinyl propionate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene, chloroprene, tetrafluoroethylene, vinyl chloride, vinylidene fluoride, and vinylidene chloride;

N,N,-dimethyl(meth)acrylamide, a vinylalkyl ether, an alkyl halide vinyl ether, a vinylalkyl ketone, butyl acrylate, propyl methacrylate, benzyl (meth)acrylate, octyl (meth)acrylate, decyl methacrylate, cyclododecyl acrylate, 3-ethoxypropyl acrylate, methoxy-butyl acrylate, 2-ethylbutyl acrylate, 1,3-dimethylbutyl acrylate, 2-methylpentyl acrylate, aziridinylethyl (meth)acrylate, and 2-ethylhexylplyoxyalkylene (meth)acrylate;

An alkyl crotonate, an alkyl maleate, an alkyl fumarate, an alkyl citraconate, an alkyl mesaconate, an allyl acetate, N-vinylcarbazole, maleimide, N-methylmaleimide, a (meth)acrylate having a silicone in its side chain, a (meth)acrylate having a urethane bond, a (meth)acrylate having a polyoxy alkylene chain with a terminal $C_{1-4}$ alkyl group, etc.;

Methoxymethyl (meth)acrylamide, ethoxymethyl (meth)acrylamide, butoxymethyl (meth)acrylamide, diacetone acrylamide, γ-methacryloyloxypropyltrimethoxysilane, trimethoxyvinylsilane, vinyltrimethoxysilane, dimethylaminoethyl (meth)acrylate, diethylaminoethyl (meth)acrylate, dimethylaminopropyl (meth)acrylate, (meth)acryloylmorpholine, (meth)acryloyloxyethyltrimethylammonium chloride, (meth)acryloyloxypropyltrimethylammonium chloride, (meth)acrylamideethyltrimethylammonium chloride, and (meth)acrylamidepropyltrimethylammonium chloride; and t-butyl(meth)acrylamide sulfonic acid, (meth)acrylamide, N-methyl(meth)acrylamide, N-methylol(meth)acrylamide, N-butoxymethyl(meth)acrylamide, diacetone(meth)acrylamide, glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl methacrylate, a polyoxyalkylene glycol mono(meth)acrylate, (meth)acrylic acid, 2-(meth)acryloylxyethylsuccinic acid, 2-(meth)acryloylxyhexahydrophthalic acid, 2-(meth)acryloyloxyethyl acid phosphate, allyl (meth)acrylate, 2-vinyl-2-oxazoline, and a polycaprolactone ester of 2-vinyl-4-methyl-(2-vinyloxazoline)hydroxyethyl (meth)acrylate.

The proportion of the polymerized units derived from monomer (a) is from 40 to 60 mass % in the copolymer (100 mass %), from the viewpoint of water/oil repellency and durability of the water/oil repellent composition, durability against washing, mechanical stability and stability to foreign substances, and from the viewpoint of the texture of an article.

The proportion of the polymerized units derived from monomer (b) is from 25 to 59.9 mass %, preferably from 35 to 58 mass %, in the copolymer (100 mass %), from the viewpoint of water/oil repellency and durability of the water/oil repellent composition, durability against washing, mechanical stability and stability to foreign substances, and from the viewpoint of the texture of an article.

The proportion of the polymerized units derived from monomer (c) is from 0.1 to 15 mass %, preferably from 0.1 to 8 mass %, in the copolymer (100 mass %), from the viewpoint of water/oil repellency and durability of the water/oil repellent composition, durability against washing, mechanical stability and stability to foreign substances, and from the viewpoint of the texture of an article.

The proportion of the polymerized units derived from monomer (d) is preferably from 0 to 35 mass %, more preferably from 0 to 25 mass %, in the copolymer (100 mass %), from the viewpoint of water/oil repellency and durability of the water/oil repellent composition, durability against washing, mechanical stability and stability to foreign substances, and from the viewpoint of the texture of an article.

The proportions of polymerized units derived from monomers in the present invention are calculated based on the amounts of monomers charged for producing the copolymer.

(Medium)

The medium may, for example, be water, an alcohol, a glycol, a glycol ether, a halogen compound, a hydrocarbon, a ketone, an ester, an ether, a nitrogenous compound, a sulfur compound, an inorganic solvent, or an organic acid. Among them, at least one selected from the group consisting of water, an alcohol, a glycol, a glycol ether and a glycol ester is preferred from the viewpoint of solubility and ease in handling.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, or 3-heptanol.

The glycol may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate or propylene glycol. The glycol ether may, for example, be propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol, or hexylene glycol.

The halogen compound may, for example, be a halogenated hydrocarbon, or a halogenated ether.

The halogenated hydrocarbon may, for example, be a hydrochlorofluorocarbon, a hydrofluorocarbon, or a hydrobromocarbon.

The halogenated ether may, for example, be a hydrofluoro ether.

The hydrofluoro ether may, for example, be a separated-type hydrofluoro ether or a non-separated-type hydrofluoro ether. The separated-type hydrofluoro ether is a compound wherein an $R^F$ or perfluoroalkylene group, and an alkyl or alkylene group, are connected via an etheric oxygen atom. The non-separated-type hydrofluoro ether is a hydrofluoro ether having a partially fluorinated alkyl or alkylene group.

The hydrocarbon may, for example, be an aliphatic hydrocarbon, an alicyclic hydrocarbon, or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane, or hexadecane.

The alicyclic hydrocarbon may, for example, be cyclopentane, methylcyclopentane, cyclohexane, methylcyclohexane, or ethylcyclohexane.

The aromatic hydrocarbon may, for example, be benzene, toluene, or xylene.

The ketone may, for example, be acetone, methyl ethyl ketone, 2-pentanone, 3-pentanone, 2-hexanone, or methyl isobutyl ketone.

The ester may, for example, be methyl acetate, ethyl acetate, butyl acetate, methyl propionate, methyl lactate, ethyl lactate, or pentyl lactate.

The ether may, for example, be diisopropyl ether, dioxane, or tetrahydrofuran.

The nitrogenous compound may, for example, be pyridine, N,N-dimethylformaldehyde, N,N-dimethylacetamide, or N-methylpyrrolidone.

The sulfur compound may, for example, be dimethyl sulfoxide, or sulfolane.

The inorganic solvent may, for example, be liquid carbon dioxide.

The organic acid may, for example, be acetic acid, propionic acid, malic acid, or lactic acid.

One of such media may be used alone, or two or more of the them may be used in combination as a mixture. When two or more of such media are used in combination as a mixture, one of them is preferably water. By using a mixture of media, control of solubility and dispersibility may be easy, and control of penetrating properties and wettability to an article and solvent drying speed at the time of manufacture may be easy.

(Surfactant)

The surfactant may be a hydrocarbon surfactant or a fluorinated surfactant, and, each of them includes an anionic surfactant, a non ionic surfactant, a cationic surfactant and a zwitterizonic surfactant.

From the viewpoint of dispersing stability, the surfactant is preferably a combination of a nonionic surfactant and a cationic surfactant, or an anionic surfactant alone, preferably a combination of a nonionic surfactant and a cationic surfactant.

The ratio of a nonionic surfactant to a cationic surfactant (a nonionic surfactant/a cationic surfactant) is preferably from 97/3 to 40/60 (mass ratio).

In a specific combination of a nonionic surfactant and an cationic surfactant, their total amount in the copolymer (100 mass %) can be adjusted to be at most 5 mass %, whereby bad effects to water repellency of an article can be reduced.

The nonionic surfactant is preferably at least one member selected from the group of surfactants $s^1$ to $s^6$.

Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As $s^1$, one of such surfactants may be used alone, or two or more of them may be used in combination.

An alkyl group, an alkenyl group, an alkapolyenyl group or a polyfluoroalkyl group (hereinafter collectively referred to as an $R^S$ group) preferably has from 4 to 26 carbon atoms. The $R^S$ group may have a straight chain structure or a branched structure. The branched-structured $R^S$ group is preferably a secondary alkyl group, a secondary alkenyl group or a secondary alkapolyenyl group. A part or all of the hydrogen atoms of the $R^S$ group may be substituted by fluorine atoms.

Specific examples of the $R^S$ group include an octyl group, an dodecyl group, a tetradecyl group, a hexadecyl group, a stearyl group (octadecyl group), a behenyl group (docosyl group), an oleyl group (9-octadecenyl group), a heptadecylfluorooctyl group, a tridecylfluorohexyle group, 1H,1H,2H,2H-tridecylfluorooctyl group, and a 1H, 1H,2H,2H-nonafluorohexyl group.

A polyoxyalkylene (hereinafter referred to as POA) chain is preferably a catenated chain consisting of two or more of polyoxyethylene (hereinafter referred to as POE) chains and/or polyoxypropylene (hereinafter referred to as POP) chains. The POA chain may consists of one type of POA chains or two or more types of POA chains. When the POA chain consists of two or more types of POA chains, such POA chains are preferably linked to form blocks.

Surfactant $s^1$ is more preferably compound ($s^{11}$):

$$R^{10}O[CH_2CH(CH_3)O]_s-(CH_2CH_2O)_rH \qquad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. Some of the hydrogen atoms of the $R^{10}$ may be substituted by fluorine atoms.

When r is at least 5, the surfactant is soluble in water and homogeneously soluble in an aqueous medium, whereby the water/oil repellent composition has good penetrating properties to an article. When r is at most 50, its hydrophilicity is suppressed and water repellency will be good.

When s is at most 20, the surfactant is soluble in water and homogeneously soluble in an aqueous medium, whereby the water/oil repellent composition has good penetrating properties to an article.

When r and s are at least 2, the POE chains and the POP chains are linked to form blocks.

$R^{10}$ is preferably a straight chain or a branched chain.

r is preferably an integer of from 10 to 30.

s is preferably an integer of from 0 to 10.

The followings compounds may be mentioned as examples of compound ($s^{11}$), wherein the POE chains and the POP chains are linked in block form:

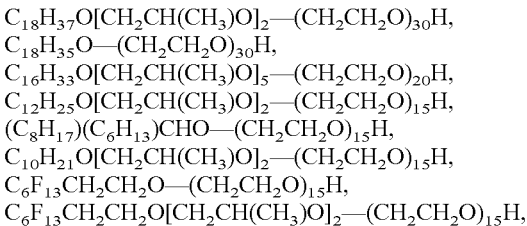

$C_{18}H_{37}O[CH_2CH(CH_3)O]_2-(CH_2CH_2O)_{30}H$,
$C_{18}H_{35}O-(CH_2CH_2O)_{30}H$,
$C_{16}H_{33}O[CH_2CH(CH_3)O]_5-(CH_2CH_2O)_{20}H$,
$C_{12}H_{25}O[CH_2CH(CH_3)O]_2-(CH_2CH_2O)_{15}H$,
$(C_8H_{17})(C_6H_{13})CHO-(CH_2CH_2O)_{15}H$,
$C_{10}H_{21}O[CH_2CH(CH_3)O]_2-(CH_2CH_2O)_{15}H$,
$C_6F_{13}CH_2CH_2O-(CH_2CH_2O)_{15}H$,
$C_6F_{13}CH_2CH_2O[CH_2CH(CH_3)O]_2-(CH_2CH_2O)_{15}H$,
and

$C_4F_9CH_2CH_2O[CH_2CH(CH_3)O]_2-(CH_2CH_2O)_{15}H$.

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy group(s) in its molecule.

Surfactant $s^2$ may have a POA chain in the molecule. The POA chain may, for example, be a POE chain, a POP chain, a chain wherein POE chains and POP chains are linked in a random manner, or a chain wherein POE chains and POP chains are linked in block form.

Surfactant $s^2$ is preferably compounds ($s^{21}$) to ($s^{24}$):

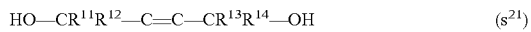

$$HO—CR^{11}R^{12}—C≡C—CR^{13}R^{14}—OH \quad (s^{21})$$

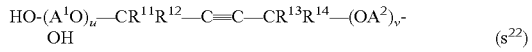

$$HO-(A^1O)_u—CR^{11}R^{12}—C≡C—CR^{13}R^{14}—(OA^2)_v- \\ OH \quad (s^{22})$$

$$HO—CR^{15}R^{16}—C≡C—H \quad (s^{23})$$

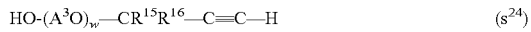

$$HO-(A^3O)_w—CR^{15}R^{16}—C≡C—H \quad (s^{24})$$

Each of $A^1$ to $A^3$ is an alkylene group.

Each of u and v is an integer of at least 0, and (u+v) is an integer of at least 1.

w is at least 1.

When each of u, v and w is at least 2, the plurality of each of $A^1$, $A^2$ and $A^3$ may be the same or different, respectively.

A POA chain is preferably a POE chain, a POP chain or a chain containing a POE chain and a POP chain. The number of repeating units of a POA chain is preferably 1 to 50.

Each of $R^{11}$ to $R^{16}$ is a hydrogen atom or an alkyl group.

The alkyl group is preferably a $C_{1-12}$ alkyl group, and more preferably a $C_{1-4}$ alkyl group. The alkyl group may, for example, be a methyl group, an ethyl group, a propyl group, a butyl group, or an isobutyl group.

Compound ($s^{22}$) is preferably compound ($s^{25}$);

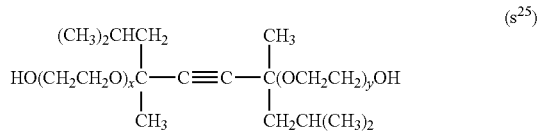

wherein each of x and y is an integer of from 0 to 100.

One of compound ($s^{25}$) may be used alone, or two or more of them may be used in combination.

Compound ($s^{25}$) is preferably a compound wherein both x and y are 0, the average of sum of x and y is from 1 to 4, or the average of sum of x and y is from 10 to 30.

Surfactant $s^3$:

Surfactant $s^3$ is a nonionic surfactant made of a compound, wherein a POE chain and a POA chain consisting of consecutively-connected two or more oxyalkylene having at least 3 carbon atoms are catenated, and both two terminals are hydroxy groups.

A polyoxytetramethylene (hereinafter referred to as POT) and/or a POP chain is preferred as such a POA chain.

Surfactant $s^3$ is preferably compound ($s^{31}$) or compound ($s^{32}$):

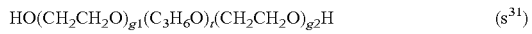

$$HO(CH_2CH_2O)_{g1}(C_3H_6O)_t(CH_2CH_2O)_{g2}H \quad (s^{31})$$

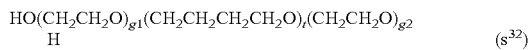

$$HO(CH_2CH_2O)_{g1}(CH_2CH_2CH_2CH_2O)_t(CH_2CH_2O)_{g2} \\ H \quad (s^{32})$$

g1 is an integer of from 0 to 200.

t is an integer of from 2 to 100.

g2 is an integer of from 0 to 200.

When g1 is 0, g2 is an integer of at least 2. When g2 is 0, g1 is an integer of at least 2.

—$C_3H_6O$— may be —$CH(CH_3)CH_2$—, —$CH_2CH$ ($CH_3$)—, or mixture of —$CH(CH_3)CH_2$— and —$CH_2CH$ ($CH_3$).

The POA chains are in block form.

The following compounds may be mentioned as examples of surfactant $s^3$:

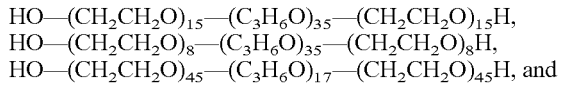

HO—$(CH_2CH_2O)_{15}$—$(C_3H_6O)_{35}$—$(CH_2CH_2O)_{15}$H,
HO—$(CH_2CH_2O)_8$—$(C_3H_6O)_{35}$—$(CH_2CH_2O)_8$H,
HO—$(CH_2CH_2O)_{45}$—$(C_3H_6O)_{17}$—$(CH_2CH_2O)_{45}$H, and
HO—$(CH_2CH_2O)_{34}$—$(CH_2CH_2CH_2CH_2O)_{28}$—$(CH_2CH_2O)_{34}$H.

Surfactant $s^4$:

Surfactant $s^4$ is a nonionic surfactant having an amine-oxide portion in the molecule.

Surfactant $s^4$ is preferably compound ($s^{41}$);

$$(R^{17})(R^{18})(R^{19})N(→O) \quad (s^{41})$$

wherein each of $R^{17}$ to $R^{19}$ is an monovalent hydrocarbon group.

A surfactant having an amine oxide (N→O) is regarded as the nonionic surfactant in the present invention.

One of compound ($s^{41}$) may be used alone, or two or more of them may be used in combination.

Compound ($s^{41}$) is preferably compound ($s^{42}$) from the viewpoint of dispersion stability of the copolymer;

$$(R^{20})(CH_3)_2N(→O) \quad (s^{42})$$

wherein $R^{20}$ is a $C_{6-22}$ alkyl group, a $C_{6-22}$ alkenyl group, a phenyl group combined with a $C_{6-22}$ alkyl group, a phenyl group combined with a $C_{1-22}$ alkenyl group, or a $C_{6-13}$ fluoroalkyl group. $R^{20}$ is preferably a $C_{8-22}$ alkyl group, a $C_{8-22}$ alkenyl group or a $C_{4-9}$ polyfluoroalkyl group.

The following compounds may be mentioned as examples of compound ($s^{42}$):

[$H(CH_2)_{12}$]$(CH_3)_2N(→O)$,
[$H(CH_2)_{14}$]$(CH_3)_2N(→O)$,
[$H(CH_2)_{16}$]$(CH_3)_2N(→O)$,
[$H(CH_2)_{18}$]$(CH_3)_2N(→O)$,
[$F(CF_2)_6(CH_2)_2$]$(CH_3)_2N(→O)$, and
[$F(CF_2)_4(CH_2)_2$]$(CH_3)_2N(→O)$.

Surfactant $s^5$:

Surfactant $s^5$ is a nonionic surfactant made of a polyoxyethylene mono(substituted phenyl)ether condensate or a polyoxyethylene mono(substituted phenyl)ether.

The substituted phenyl group is preferably a phenyl group substituted by a monovalent hydrocarbon group, and more preferably a phenyl group substituted by an alkyl group, an alkenyl group or a styryl group.

Surfactant $s^5$ is preferably a polyoxyethylene mono(alkylphenyl)ether condensate, a polyoxyethylene mono(alkenylphenyl)ether condensate, a polyoxyethylene mono(alkylphenyl)ether, a polyoxyethylene mono(alkenylphenyl)ether, or a polyoxyethylene mono[(alkyl)(styryl)phenyl]ether.

The polyoxyethylene mono(substituted phenyl)ether condensate or polyoxyethylene mono(substituted phenyl)ether may, for example, be a formaldehyde condensate of polyoxyethylene mono(nonylphenyl)ether, polyoxyethylene mono (nonylphenyl)ether, polyoxyethylene mono(octylphenyl) ether, polyoxyethylene mono(oleylpheyl)ether, polyoxyethylene [(nonyl)(styryl)phenyl]ether, or polyoxyethylene mono[(oleyl)(styryl)phenyl]ether.

Surfactant $s^6$:

Surfactant $s^6$ is a nonionic surfactant made of a fatty acid ester of a polyol.

The polyol represents glycerin, sorbitan, sorbit, polyglycerin, polyethylene glycol, polyoxyethylene glyceryl ether, polyoxyethylene sorbitan ether, or polyoxyethylene sorbit ether.

Surfactant $s^6$ may, for example, be an ester derived from stearic acid and polyethylene glycol in 1:1 molar ratio, an ester derived from an ether of sorbit and polyethylene glycol, and oleic acid in 1:4 molar ratio, an ester derived from an ether of polyoxyethylene glycol and sorbitan, and stearic acid in 1:1 molar ratio, an ester derived from an ether of polyethylene glycol and sorbitan, and oleic acid in 1:1 molar ratio, an ester derived from dodecanoic acid and sorbitan in 1:1 molar ratio, an ester derived from oleic acid and decaglycerin in 1:1 or 2:1 molar ratio, and an ester derived from stearic acid and decaglycerin in 1:1 or 2:1 molar ratio.

Surfactant $s^7$:

When the surfactant contains a cationic surfactant, surfactant $s^7$ is preferred as such a cationic surfactant.

Surfactant $s^7$ is a cationic surfactant of a substituted ammonium salt form.

Surfactant $s^7$ is preferably an ammonium salt, wherein at least one hydrogen atom connected to the nitrogen atom is substituted by an alkyl group, an alkenyl group or a POA chain having a hydroxy group at the terminal, and is more preferably compound $(s^{71})$;

$$[(R^{21})_4N^+].X^- \qquad (s^{71})$$

wherein $R^{21}$ is a hydrogen atom, a $C_{1-22}$ alkyl group, a $C_{2-22}$ alkenyl group, a $C_{1-9}$ fluoroalkyl group, or a POA chain having a hydroxy group at the terminal.

The four $R^{21}$ may be the same or different, however, all of the four $R^{21}$ are not hydrogen atoms at the same time.

$R^{21}$ is preferably a $C_{6-22}$ long-chain alkyl group, a $C_{6-22}$ long-chain alkenyl group, or a $C_{1-9}$ fluoroalkyl group.

When $R^{21}$ is an alkyl group other than a long-chain alkyl group, the $R^{21}$ is preferably a methyl group or an ethyl group.

When $R^{21}$ is a POA chain having a hydroxy group at the terminal, the POA chain is preferably a POE chain.

$X^-$ is a counter ion.

$X^-$ is preferably a chloride ion, an ethylsulfate ion or an acetate ion.

Compound $(s^{71})$ may, for example, be monostearyltrimethylammonium chloride, monostearyldimethylmonoethylammonium ethylsulfate, mono(stearyl)monomethyldi(polyethylene glycol)ammonium chloride, monofluorohexyltrimethylammonium chloride, di(tallow alkyl)dimethylammonium chloride, or dimethyl mono coconut amine acetate.

Surfactant $s^8$:

When the surfactant contains a zwitterizonic surfactant, surfactant $s^8$ is preferred as such a surfactant.

Surfactant $s^8$ is alanine, imidazolinium betaine, amidebetaine or betaine acetate.

The hydrophobic group is preferably a $C_{6-22}$ long-chain alkyl group, a $C_{6-22}$ long-chain alkenyl group, or a $C_{1-9}$ fluoroalkyl group.

Surfactant $s^8$ may, for example, be dodecylbetaine, stearylbetaine, dodecylcarboxymethylhydroxyethyl imidazolinium betaine, dodecydimethylaminoacetate betaine, or fatty acid amidepropyl dimethylaminoacetate betaine.

Surfactant $s^9$:

Surfactant $s^9$ may used as the surfactant.

Surfactant $s^9$ is a polymeric surfactant made of a block copolymer, a random copolymer or a hydrophobically modified body of a hydrophilic copolymer derived from a hydrophilic monomer and a hydrophobic hydrocarbon and/or a fluoro monomer.

Surfactant $s^9$ may, for example, be a block or random copolymer derived from polyethylene glycol (meth)acrylate and a long-chain alkyl acrylate, a block or random copolymer derived from polyethylene glycol (meth)acrylate and a fluoro (meth)acrylate, a block or random copolymer derived from vinyl acetate and a long-chain alkyl vinyl ether, a block or random copolymer derived from vinyl acetate and a long-chain alkylvinyl ester, a polymer derived from styrene and maleic anhydride, a condensate of polyvinyl alcohol and stearic acid, a condensate of polyvinyl alcohol and stearyl mercaptan, a condensate of polyallylamine and stearic acid, a condensate of polyethyleneimine and stearyl alcohol, methylcellulose, hydroxypropylmethylcellulose, or hydroxyethylmethylcellulose.

Examples of a commercial product of surfactant $s^9$ include MP Polymer (item code: MP-103, MP-203) manufactured by Kurary Co., Ltd., resins manufactured by Elf Atochem Inc., METOLOSE manufactured by Shin-Etsu Chemical Co., Ltd., EPOMIN RP manufactured by NIPPON SHOKUBAI Co., Ltd., and Surflon (item code: S-381, S-393) manufactured by AGC Seimi Chemical Co., Ltd.

Surfactant $s^9$ is preferably surfactant $s^{91}$ when the solvent is organic, or the organic content in the solvent is high;

Surfactant $s^9$: a polymeric surfactant made of a block or random copolymer (or a polyfluoroalkyl denaturalized body thereof) derived from a lipophilic monomer and a fluoromonomer.

Surfactant $s^{91}$ may, for example, be a copolymer derived from an alkyl acrylate and fluoro (meth)acrylate, or a copolymer derived from an alkylvinylether and a fluoroalkylvinylether.

Examples of a commercial product of surfactant $s^{91}$ include Surflon (item code: S-383, SC-100 series) manufactured by AGC Seimi Chemical Co., Ltd.

From the viewpoint of excellence in water repellency and durability of the water/oil repellent composition, combination of the surfactants is preferably a combination of surfactant $s^1$, surfactant $s^2$ and surfactant $s^7$; a combination of surfactant $s^1$, surfactant $s^3$ and surfactant $s^7$; or a combination of surfactant $s^1$, surfactant $s^2$, surfactant $s^3$ and surfactant $s^7$, and more preferably such combinations wherein surfactant $s^7$ is compound $(s^{71})$.

The proportion of the total amount of the surfactant is preferably from 1 to 6 parts by mass based on the copolymer (100 parts by mass).

(Additive)

The water/oil repellent composition of the present invention may contain various additives as required.

Additives may, for example, be a penetrant, an anti-foaming agent, a water absorbent, an anti-stat, an anti-crease agent, a texture conditioner, a film-forming aid, a water-soluble polymer (polyacrylamide, polyvinyl alcohol, etc.), a thermosetting agent (melamine resin, urethane resin, etc.), an epoxy curing agent (isophthalic acid hydrazide, adipic acid dihydrazide, sebacic acid dihydrazide, dodecanedioic acid dihydrazide, 1,6-hexamethylene bis(N,N-dimethylsemicarbazide, 1,1,1',1'-tetramethyl-4,4'-(methylene-di-p-phenylene) disemicarbazide, spiroglycol, etc.), a thermosetting catalyst, a cross-linking catalyst, a synthetic resin, a fiber stabilizer, another fluorinated water/oil repellent agent or a non-fluorinated water/oil repellent agent.

(Method for Producing Water/Oil Repellent Composition)

The water/oil repellent composition is produced, for example, by the following method (i) or (ii):

(i) a method wherein a monomer mixture comprising monomers (a) to (c) and, as necessary, (d) is polymerized in a medium in the presence of a surfactant and a polymerization initiator to obtain a solution, dispersion or emulsion of a copolymer, and then, as necessary, other media, other surfactants and additives are added thereto;

(ii) a method wherein a monomer mixture comprising monomers (a) to (c) and, as necessary, (d) is polymerized in a medium in the presence of a surfactant and a polymerization initiator to obtain a solution, dispersion or emulsion of a copolymer, then the copolymer is separated, and then, a medium, a surfactant, and as necessary additives are added to the copolymer.

The polymerization method may, for example, be dispersion polymerization, emulsion polymerization, or suspension polymerization.

The method wherein a monomer mixture comprising monomers (a) to (c) and, as necessary, (d) is emulsion-polymerized in an aqueous medium in the presence of a surfactant and a polymerization initiator to obtain an emulsion of a copolymer, is preferred as the method for producing a water/oil repellent compound.

It is preferred to pre-emulsify the mixture comprising monomers, a surfactant and an aqueous medium before emulsion polymerization from the viewpoint of yield improvement of the copolymer.

Examples of the polymerization initiator are a thermal polymerization initiator, an optical polymerization initiator, a radiation polymerization initiator, a radical polymerization initiator, an ionic polymerization initiator, etc., and a water-soluble or oil-soluble radical polymerization initiator is preferred.

Common polymerization initiators such as an azo polymerization initiator, a peroxide polymerization initiator, a redox polymerization initiator, etc. are used as a radical polymerization initiator depending on the polymerization temperature. The radical polymerization initiator is particularly preferably an azo compound, and further preferably a salt of an azo compound when polymerization is carried out in an aqueous medium. The polymerization temperature is preferably between 20° C. and 150° C.

Additive amount of the polymerization initiator is preferably from 0.1 to 5 parts by mass, more preferably from 0.1 to 3 parts by mass, per 100 parts by mass of the total amount of monomers.

A molecular weight modifier may be used in the polymerization of monomers. The molecular weight modifier is preferably an aromatic compound, a mercapto alcohol or a mercaptan, particularly preferably an alkylmercaptan. The molecular weight modifier may, for example, be mercaptoethanol, n-octylmercaptan, n-dodecylmercaptan, t-dodecylmercaptan, stearylmercaptan, or α-methylstyrene dimer ($CH_2=C(Ph)CH_2C(CH_3)_2Ph$, wherein Ph is a phenyl group).

Additive amount of the molecular weight modifier is preferably from 0.01 to 5 parts by mass, more preferably from 0.1 to 3 parts by mass, per 100 parts by mass of the total amount of monomers.

The proportion of monomer (a) is from 40 to 60 mass % in the monomer mixture (100 mass %) from the viewpoint of water/oil repellency and durability of the water/oil repellent composition, durability against washing, mechanical stability and stability to foreign substances, and from the viewpoint of the texture of an article.

The proportion of monomer (b) is preferably from 25 to 59.9 mass %, more preferably from 35 to 58 mass %, in the monomer mixture (100 mass %) from the viewpoint of water/oil repellency and durability of the water/oil repellent composition, durability against washing, mechanical stability and stability to foreign substances, and from the viewpoint of the texture of an article.

The proportion of monomer (c) is preferably from 0.1 to 15 mass %, more preferably from 0.1 to 8 mass %, in the monomer mixture (100 mass %) from the viewpoint of water/oil repellency and durability of the water/oil repellent composition, durability against washing, mechanical stability and stability to foreign substances, and from the viewpoint of the texture of an article.

The proportion of monomer (d) is preferably from 0 to 35 mass %, more preferably from 0 to 25 mass %, in the monomer mixture (100 mass %) from the viewpoint of water/oil repellency and durability of the water/oil repellent composition, durability against washing, mechanical stability and stability to foreign substances, and from the viewpoint of the texture of an article.

Regarding the water/oil repellent composition of the present invention, the copolymer is preferably dispersed particles in the medium. The average particle size of the copolymer is preferably from 10 to 1,000 nm, more preferably from 10 to 300 nm, particularly preferably from 10 to 200 nm. When the average particle size is within such a range, a surfactant, a dispersant, etc. are not required in large amounts, water/oil repellency is good, dyed fabrics can be treated without color dulling, and the particles are stably-dispersed without precipitation in the medium. The average particle size is measured by a dynamic light scattering device, an electron microscope, etc.

The solid content concentration of the water/oil repellent composition of the present invention is preferably from 25 to 40 mass % in the water/oil repellent composition (100 mass %) immediately after the production thereof.

The solid content concentration of the water/oil repellent composition of the present invention is preferably from 0.2 to 5 mass % in the water/oil repellent composition (100 mass %) at the time of treating articles.

The solid content concentration of the water/oil repellent composition is calculated from the mass of the water/oil repellent composition before heating and the mass of it after drying in the convection-drying machine at the temperature of 120° C. for 4 hours.

The above-described water/oil repellent composition can impart water/oil repellency to articles without having its texture deteriorated and has excellent durability against washing, mechanical stability and stability to foreign substances, because it comprises the copolymer having specific combinations of polymerized units and having each type of polymerized units in a specific ratio.

And, because the water/oil repellent composition of the present invention is based on monomer (a), which has an $R^F$ group having at most 6 carbon atoms, the content (the content when the solid content concentration of the water/oil repellent composition is 20 mass %) of perfluorooctane (PFOA), perfluorooctane sulfonate (PFOS), and their precursors and analogs, environmental impact of which is pointed out, is reduced to under the detection limit of analysis value of LC-MS/MS in the method disclosed in Japanese Patent Application No. 2007-333564.

<Article>

The article of the present invention is an article treated with the water/oil repellent composition of the present invention.

Examples of the article treated with the water/oil repellent composition of the present invention include fibers (natural fibers, synthetic fibers, blended fibers, etc.), various fiber products, nonwoven fabrics, resins, paper, leather, metal, stone, concrete, plaster, and glass.

An example of a method for treating the article is to coat or impregnate the article with the water/oil repellent composition by a publicly-known coating method and then to dry it.

Fabric products treated with the water/oil repellant composition of the present invention have softened textile because of softness of the coating, and are given water/oil repellency of high quality. And, they have excellent adhesion on the surface, and are given water/oil repellency by curing at a low temperature. And, because deterioration of the performance by friction and washing is small, the initial performance at the treatment can be stably maintained. Paper treated with the composition has excellent size property, water repellency and oil repellency even when dried under a low-temperature drying condition. When resins, glass or surface of metals is treated with the composition, a water/oil repellent coating film which has good adhesion to an article and good film-forming property is formed.

EXAMPLES

Now, the present invention will be described in detail with reference to Examples. It should be understood, however, that the present invention is by no means limited to these Examples.

Examples 1 to 9 are working examples of the present invention, and Examples 10 to 13 are Comparative Examples.
(Water Repellency)

Water repellency of a test cloth was measured in accordance with the spray test in JIS L1092. Water repellency was measured in grades listed in Table 1. +(−) beside the grade means that the property is slightly better(worse).

TABLE 1

| Water repellency level | State of object |
|---|---|
| 100 | No moistening or water drops on the surface |
| 90 | Slight water drops on the surface |
| 80 | Separate partial moistening on the surface |
| 70 | Moistening on the half of the surface |
| 50 | Moistening over the entire surface |
| 0 | Completely wetted |

(Oil Repellency)

Oil repellency of the test cloth was measured in accordance with the test method of AATCC-TM118-1966. Oil repellency was measured in grades listed in Table 2. +(−) beside the grade means that the property is slightly better(worse).

TABLE 2

| Oil repellency No. | Test liquid | Surface tension mN/m (25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol 65 part/hexadecane 35 part | 29.6 |
| 1 | Nujol | 31.2 |
| 0 | Oil repellency less than that of No. 1 | — |

(Durability Against Washing)

The test cloth was washed repeatedly for 5 times in accordance with the water-wash method of Annex Table 103 in JIS L0217. Next, it was dried in a room at a room temperature of 25° C. under a humidity of 60% overnight, and then the water repellency was measured.
(Mechanical Stability)

250 g of the water/oil repellent composition was heated to 30° C. in a hot bath, stirred by a homo mixer (manufactured by NIHONSEIKI KAISHA Ltd., BIO MIXER) at 3,000 rpm for 5 minutes, and then filtrated through a brown doeskin. Traces remaining on the doeskin surface were observed. Mechanical stability was evaluated with 5-point scale of from 5 to 1, where 5 point represents no trace. A result of low point means that the test cloth has low mechanical stability.
(Stability to Foreign Substances)

Sumikaron Red SE-RPD (manufactured by Sumika Chemtex Company, Limited.) was added to 250 g of the water/oil repellent composition so that its concentration would be 0.05 g/L. The said fluid was heated to 30° C. in a hot bath, stirred by a homo mixer (manufactured by NIHONSEIKI KAISHA Ltd., BIO MIXER) at 3,000 rpm for 5 minutes, and then filtrated through a brown doeskin. Traces remaining on the doeskin surface were observed. Stability to foreign substances was evaluated with 5-point scale of from 5 to 1, where 5 point represents no trace. A result of low point means that the test cloth has low stability to foreign substances.

Stability to foreign substances of the test cloth was evaluated also with Nylosan Blue N-BLN (manufactured by Clariant) instead of Sumikaron Red SE-RPD.
(Texture)

The test cloth was left in a constant-temperature/constant-humidity room for a day, where the temperature was 20° C.±2° C. and the humidity was 65%±2%, and then softness of the test cloth was evaluated by sensory test by five persons. The test cloth was evaluated with three levels of: 1: hard, 2: medium and 3: soft, and the average for five persons was treated as the evaluation result.

Example 1

The following materials were put into a glass beaker, heated at 60° C. for 30 minutes, and then mixed by a homo mixer (manufactured by NIHONSEIKI KAISHA Ltd., BIO MIXER) to obtain a mixed solution: 61.4 g of $C_6F_{13}C_2H_4OCOC(CH_3)=CH_2$ (hereinafter referred to as C6FMA) as monomer (a), 43.1 g of stearyl acrylate (hereinafter referred to as STA) as monomer (b), 3.2 g of 3,5-dimethylpyrazole adduct of 2-isocyanatoethyl methacrylate (indicated by the formula (5) below, hereinafter referred to as D-BI) as monomer (c1), 32.3 g of a 10 mass % aqueous solution of polyoxyethylene oleyl ether (ethylene oxide 26 mol adduct, manufactured by Kao Corp., EMULGEN-430, hereinafter referred to as PEO-30) as surfactant $s^1$, 10.8 g of a 10 mass % aqueous solution of monostearyltrimethylammonium chloride (hereinafter referred to as STMC) as surfactant $s^7$ (compound ($s^{71}$)), 10.8 g of a 10 mass % aqueous solution of alkyl $C_{8-18}$ trimethyl ammonium chloride (manufactured by LION AKZO Co., Ltd., Arquad C-50, hereinafter referred to as AC-50), 21.5 g of a 10 mass % aqueous solution of ethylene oxide-propylene oxide polymeric substance (ethylene oxide 40 mass % adduct, average molecular weight of PPG: 1000, manufactured by NOF Corporation, PRONONE-102, hereinafter referred to as P-102) as surfactant $s^3$, 50.6 g of de-ionized water, 64.6 g of dipropyleneglycol (hereinafter referred to as DPG), and 0.8 g of n-dodecylmercaptane (hereinafter referred to as nDOSH).

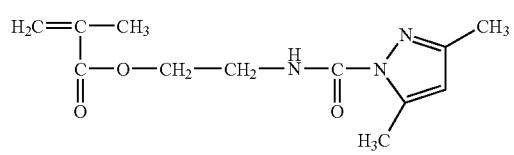

(5)

The mixed solution was treated by a high-pressure emulsification equipment (manufactured by APV Rannie, Mini-Lab) at 60° C. and at 40 MPa to obtain an emulsion. 250 g of the emulsion was put into a stainless-steel reaction container, and was cooled to 40° C. or lower. 5.8 g of a 10 mass % aqueous solution of 2,2'-azobis[2-(2-imidazoline-2-yl)propane] (manufactured by Wako Pure Chemical Industries, Ltd., VA061) acetate (hereinafter referred to as VA061A) as a polymerization initiator were added into the emulsion. Next, the gas phase was replaced with nitrogen, and then, polymerization was carried out at 60° C. for 15 hours with stirring to obtain a copolymer emulsion which had a solid content concentration of 36.8 mass %. The proportions of polymerized units derived from the respective monomers are shown in Table 4.

(Evaluation)

The copolymer emulsion was diluted with distilled water to the solid content concentration of 20 mass % and adjusted so that the emulsion of 20 mass % of the solid content concentration would be 1 mass % thereby to obtain a water/oil repellent composition. A polyethylene terephthalate (hereinafter referred to as PET) cloth was soaked with the water/oil repellent composition, and it was wrung by a mangle roller so that the wringing rate would be 86 mass %. This cloth was dried at 110° C. for 90 seconds, cured at 170° C. for 60 seconds, and then left in a room at a temperature of 25° C. under a humidity of 60% overnight to obtain a test cloth. Water repellency of the test cloth was evaluated. The results are shown in Table 5.

The copolymer emulsion was diluted with distilled water to the solid content concentration of 20 mass % and adjusted so that the emulsion of 20 mass % of the solid content concentration would be 3 mass % thereby to obtain a water/oil repellent composition. A PET cloth was soaked with the water/oil repellent composition, and it was wrung by a mangle roller so that the wringing rate would be 86 mass %. This cloth was dried at 110° C. for 90 seconds, cured at 170° C. for 60 seconds, and then left in a room at a temperature of 25° C. under a humidity of 60% overnight to obtain a test cloth. Water repellency and oil repellency of the test cloth were evaluated. The results are shown in Table 5.

The copolymer emulsion was diluted with distilled water to the solid content concentration of 20 mass % and adjusted so that the emulsion of 20 mass % of the solid content concentration would be 3 mass %, and then Sumitex Resin M-3 (manufactured by Sumitomo Chemical Co., Ltd.) as a thermosetting agent and Sumitex Accelerator ACX (manufactured by Sumitomo Chemical Co., Ltd.) as a thermosetting catalyst were added so that each concentration would be 0.3 mass % thereby to obtain a water/oil repellent composition. A PET cloth was soaked with the water/oil repellent composition, and it was wrung by a mangle roller so that the wringing rate would be 86 mass %. This cloth was dried at 110° C. for 90 seconds, cured at 170° C. for 60 seconds, and then left in a room at a temperature of 25° C. under a humidity of 60% overnight to obtain a test cloth. Water repellency and durability against washing of the test cloth were evaluated. The results are shown in Table 5.

The copolymer emulsion was diluted with distilled water to the solid content concentration of 20 mass % and adjusted so that the emulsion of 20 mass % of the solid content concentration would be 2 mass % thereby to obtain a water/oil repellent composition. A cotton broadcloth was soaked with the water/oil repellent composition, and it was wrung by a mangle roller so that the wringing rate would be 60 mass %. This cloth was dried at 110° C. for 90 seconds, cured at 170° C. for 60 seconds, and then left in a room at a temperature of 25° C. under a humidity of 60% overnight to obtain a test cloth. Water repellency of the test cloth was evaluated. The results are shown in Table 5.

The copolymer emulsion was diluted with distilled water to the solid content concentration of 20 mass % and adjusted so that the emulsion of 20 mass % of the solid content concentration would be 5 mass % thereby to obtain a water/oil repellent composition. A cotton broadcloth was soaked with the water/oil repellent composition, and it was wrung by a mangle roller so that the wringing rate would be 60 mass %. This cloth was dried at 110° C. for 90 seconds, cured at 170° C. for 60 seconds, and then left in a room at a temperature of 25° C. under a humidity of 60% overnight to obtain a test cloth. Water repellency and oil repellency of the test cloth were evaluated. The results are shown in Table 5.

The copolymer emulsion was diluted with distilled water to the solid content concentration of 20 mass % and adjusted so that the emulsion of 20 mass % of the solid content concentration would be 5 mass %, and then MEIKANATE MF (manufactured by Meisei Chemical Works, Ltd.) as a thermosetting agent was added so that its concentration would be 1.0 mass % thereby to obtain a water/oil repellent composition. A cotton broadcloth was soaked with the water/oil repellent composition, and it was wrung by a mangle roller so that the wringing rate would be 60 mass %. This cloth was dried at 110° C. for 90 seconds, cured at 170° C. for 60 seconds, and then left in a room at a temperature of 25° C. under a humidity of 60% overnight to obtain a test cloth. Water repellency and durability against washing of the test cloth were evaluated. The results are shown in Table 5.

The copolymer emulsion was diluted with distilled water to the solid content concentration of 20 mass % and adjusted so that the emulsion of 20 mass % of the solid content concentration would be 3 mass % thereby to obtain a water/oil repellent composition. Mechanical stability and stability to foreign substances of the water/oil repellent composition were evaluated. The results were shown in Table 6.

The copolymer emulsion was diluted with distilled water to adjust the solid content concentration to 1 mass %, to obtain a water/oil repellent composition. A cotton broadcloth was soaked with the water/oil repellent composition, and it was wrung by a mangle roller so that the wringing rate would be 60 mass %. This cloth was dried at 110° C. for 90 seconds in a pintenter and cured at 170° C. for 60 seconds to obtain a test cloth. Texture of the test cloth was evaluated. The results are shown in Table 6.

Examples 2 to 13

A copolymer emulsion was obtained in the same manner as in Example 1 except that the amounts of the respective materials were changed as shown in Table 3. The proportions of polymerized units derived from the respective monomers are shown in Table 4.

A water/oil repellent composition was obtained in the same manner as in Example 1 except for using such an emulsion.

A test cloth was obtained in the same manner as in Example 1 except for using such a water/oil repellent composition.

The water/oil repellent composition and the test cloth were evaluated in the same manner as Example 1. The results are shown in Tables 5 and 6.

Abbreviations in Table 3 or 4 are as follows:
(Monomer (c1))
  HE-6P: 3-(2-butanoneoxime)isocyanatomethyl-3,5,5-trimethylcyclohexyl(2-hydroxyethylmethacrylate)cyanate (TECHCOAT HE-6P, manufactured by Kyoken Kasei)
(Monomer (c2))
  TAC: Triallyl cyanurate (manufactured by Nippon Kasei Chemical Co., Ltd.)
  AT-600: Phenylglycidylethylacrylate tolylenediisocyanate (KYOEISHA CHEMICAL Co., Ltd.)
(Monomer (d))
  NMAM: N-methylolacrylamide
  GMA: Glycidyl methacrylate
  PLC FA2D: Polycaprolactone dimeric ester of hydroxyethyl acrylate (manufactured by DAICEL CHEMICAL INDUSTRIES, LTD.)
  VCM: Vinyl chloride

TABLE 3

| Charged amount (g) | | 1 | 2 | 3 | 4 | 5 | 6 | 7 | 8 | 9 | 10 | 11 | 12 | 13 |
|---|---|---|---|---|---|---|---|---|---|---|---|---|---|---|
| (a) | C6FMA | 61.4 | 53.4 | 53.4 | 53.8 | 45.2 | 53.8 | 53.8 | 53.8 | 54.2 | 76.4 | 53.8 | 53.8 | 53.8 |
| (b) | STA | 43.1 | 50.2 | 50.2 | 49.5 | 59.2 | 50.6 | 49.5 | 50.5 | 49.9 | 13.4 | 53.8 | 50.6 | 50.6 |
| (c1) | D-BI | 3.2 | 3.2 | | | | 1.1 | 1.1 | 1.1 | 2.2 | 4.1 | | | |
| (c1) | HE-6P | | | 3.2 | | | | | | | | | | |
| (c2) | TAC | | | | 4.3 | | | 2.2 | 2.2 | 2.2 | 2.2 | | | |
| (c2) | AT-600 | | | | | 3.2 | | | | | | | | |
| (d) | NMAM | | | | | | | | | | | | | 3.2 |
| (d) | GMA | | | | | | | | | | | | 3.2 | |
| (d) | PLC FA2D | | | | | | 1.1 | | | | | | | |
| (d) | VCM | | | | | | | | | | 9.3 | | | |
| s¹ | PEO-30 | 32.3 | 53.4 | 53.4 | 32.3 | 32.3 | 32.3 | 32.3 | 32.3 | 32.5 | 25.8 | 32.3 | 32.3 | 32.3 |
| s³ | P-102 | 21.5 | | | 21.5 | 21.5 | 21.5 | | | | | 21.5 | 21.5 | 21.5 |
| s⁷ | STMC | 10.8 | 21.4 | 21.4 | 10.8 | 10.8 | 10.8 | 10.8 | 10.8 | | 5.2 | 10.8 | 10.8 | 10.8 |
| s⁷ | AC-50 | 10.8 | | | 10.8 | 10.8 | 10.8 | 10.8 | 10.8 | | | 10.8 | 10.8 | 10.8 |
| | Water | 50.6 | 60.9 | 60.9 | 50.6 | 50.6 | 50.6 | 69.9 | 69.9 | 90.0 | 132.2 | 50.6 | 50.6 | 50.6 |
| | DPG | 64.6 | 53.4 | 53.4 | 64.6 | 64.6 | 64.6 | 64.5 | 64.5 | 65.1 | 31.0 | 64.5 | 64.6 | 64.6 |
| | nDOSH | 0.8 | 1.1 | 1.1 | 0.8 | 0.8 | 0.8 | 1.1 | 0.8 | 0.8 | 1.0 | 1.1 | 0.8 | 0.8 |
| | VA061A | 5.8 | 5.8 | 5.8 | 5.8 | 5.8 | 5.8 | 5.8 | 5.8 | 6.2 | 5.9 | 5.6 | 5.8 | 5.8 |

TABLE 4

| Polymerized units (mass %) | | 1 | 2 | 3 | 4 | 5 | 6 | 7 | 8 | 9 | 10 | 11 | 12 | 13 |
|---|---|---|---|---|---|---|---|---|---|---|---|---|---|---|
| (a) | C6FMA | 57 | 50 | 50 | 50 | 42 | 50 | 50 | 50 | 50 | 74 | 50 | 50 | 50 |
| (b) | STA | 40 | 47 | 47 | 46 | 55 | 47 | 46 | 47 | 46 | 13 | 50 | 47 | 47 |
| (c1) | D-BI | 3 | 3 | | | | 1 | 1 | 1 | 2 | 4 | | | |
| (c1) | HE-6P | | | 3 | | | | | | | | | | |
| (c2) | TAC | | | | 4 | | | 2 | 2 | 2 | 2 | | | |
| (c2) | AT-600 | | | | | 3 | | | | | | | | |
| (d) | NMAM | | | | | | | | | | | | | 3 |
| (d) | GMA | | | | | | | | | | | | 3 | |
| (d) | PLC FA2D | | | | | | 1 | | | | | | | |
| (d) | VCM | | | | | | | | | | 9 | | | |
| Solid content (mass %) | | 36.8 | 35.8 | 36.2 | 35.4 | 36.2 | 35.6 | 36.5 | 36.0 | 35.4 | 36.6 | 36.8 | 35.4 | 37.2 |

TABLE 5

| | Base cloth | | | | | | | | | |
|---|---|---|---|---|---|---|---|---|---|---|
| | PET cloth | | | | | | Cotton broadcloth | | | |
| | Evaluation | | | | | | | | | |
| | Water repellency level | | | | Oil repellency No. | | Water repellency level | | | Oil repellency No. |
| | Water/oil repellent agent solid content (mass %) | | | | | | | | | |
| | 1 | 3 | 3 | 3 | 3 | 2 | 5 | 5 | 5 | 5 |
| | Thermosetting agent | | | | | | | | | |
| | Not added | Not added | Added | Added | Not added | Not added | Not added | Added | Added | Not added |
| | Number of times of washing | | | | | | | | | |
| | — | — | — | 5 | — | — | — | — | 5 | — |
| Ex. 1 | 100 | 100 | 100 | 80 | 6− | 90+ | 100 | 100 | 90− | 5− |
| Ex. 2 | 100 | 100 | 100 | 80 | 5− | 100 | 100 | 100 | 90 | 6 |
| Ex. 3 | 100 | 100 | 100 | 80+ | 5− | 90 | 100 | 100 | 90− | 6 |
| Ex. 4 | 100 | 100 | 100 | 80 | 2 | 80+ | 80+ | 100 | 80 | 5− |
| Ex. 5 | 100 | 100 | 100 | 80 | 6− | 80+ | 80+ | 100 | 80 | 6− |
| Ex. 6 | 100 | 100 | 100 | 90 | 4− | 90 | 100 | 100 | 100− | 5 |
| Ex. 7 | 100 | 100 | 100 | 80+ | 3− | 90+ | 90+ | 100 | 90− | 6− |
| Ex. 8 | 100 | 100 | 100 | 90 | 3− | 100 | 100 | 100 | 90 | 5− |
| Ex. 9 | 100 | 100 | 100 | 90+ | 3− | 90+ | 100 | 100 | 90 | 5− |
| Ex. 10 | 100 | 100 | 100 | 100− | 3− | 90+ | 90++ | 100 | 80+ | 4 |
| Ex. 11 | 100 | 100 | 100 | 70 | 2 | 80 | 80+ | 100 | 80− | 5− |
| Ex. 12 | 80 | 100 | 100 | 80− | 2 | 70 | 80 | 100 | 80 | 4− |
| Ex. 13 | 80 | 100 | 100 | 80 | 2 | 80 | 80 | 100 | 80+ | 5 |

TABLE 6

| | Mechanical stability | Stability to foreign substances | | Texture |
|---|---|---|---|---|
| | | Sumikaron Red | Nylosan Blue | |
| Ex. 1 | — | — | — | 2.6 |
| Ex. 2 | 5 | 5 | 3-4 | 2.6 |
| Ex. 3 | — | — | — | 2.8 |
| Ex. 4 | 3-4 | 3 | 3 | 2.6 |
| Ex. 5 | — | — | — | 3.0 |
| Ex. 6 | 5- | 3-4 | 4-5 | 2.8 |
| Ex. 7 | 4-5 | 3 | 4-5 | 2.8 |
| Ex. 8 | 5- | 3-4 | 4-5 | 2.8 |
| Ex. 9 | 5- | 3 | 4 | 2.8 |
| Ex. 10 | — | — | — | 1.2 |
| Ex. 11 | 3-4 | 2 | 3 | 2.2 |
| Ex. 12 | — | — | — | 2.0 |
| Ex. 13 | — | — | — | 1.8 |

INDUSTRIAL APPLICABILITY

The water/oil repellent composition of the present invention is useful as a water/oil repellent agent for fiber products (clothing items (sportswear, coats, blousons, work clothes, uniforms, etc.), bags, industrial materials, etc.), nonwoven fabrics, leather items, stone materials, concrete building materials, etc. It is also useful as a coating agent for filtering materials to be used for a liquid containing organic solvent or in the presence of vapor of the liquid, a surface-protecting agent, a coating agent for electronics or an antifouling coating agent. Further, it is useful also for an application to give water/oil repellency wherein it is mixed with polypropylene, nylon, etc., and then molded and shaped into fibers.

The entire disclosure of Japanese Patent Application No. 2007-155450 filed on Jun. 12, 2007 including specification, claims and summary is incorporated herein by reference in its entirety.

What is claimed is:

1. A water/oil repellent composition comprising a copolymer having from 40 to 60 mass % of polymerized units derived from the following monomer (a), from 25 to 59.9 mass % of polymerized units derived from the following monomer (b), and from 0.1 to 15 mass % of polymerized units derived from a combination of the following monomer (c1) and the following monomer (c2):

monomer (a): a compound of the following formula (1):

$$(Z-Y)_n X \quad (1)$$

wherein Z is a $C_{1-6}$ perfluoroalkyl group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2;

$$C_i F_{2i+1} O(CFX^1 CF_2 O)_j CFX^2— \quad (2)$$

wherein i is an integer of from 1 to 6, j is an integer of from 0 to 10, and each of $X^1$ and $X^2$ which are independent of each other, is a fluorine atom or a trifluoromethyl group;

—CR=CH$_2$ (3-1)

—COOCR=CH$_2$ (3-2)

—OCOCR=CH$_2$ (3-3)

—OCH$_2$-ϕ-CR=CH$_2$ (3-4)

—OCH=CH$_2$ (3-5)

wherein R is a hydrogen atom, a methyl group or a halogen atom, and ϕ represents a phenylene group;

—CH[—(CH$_2$)$_m$CR=CH$_2$]— (4-1)

—CH[—(CH$_2$)$_m$COOCR=CH$_2$]— (4-2)

—CH[—(CH$_2$)$_m$OCOCR=CH$_2$]— (4-3)

—OCOCH=CHCOO— (4-4)

wherein R is a hydrogen atom, a methyl group or a halogen atom, and m is an integer of from 0 to 4;

monomer (b): a (meth)acrylate having no polyfluoroalkyl group and having a $C_{12-18}$ alkyl group; and a combination of the following monomer (c1) and the following monomer (c2):

monomer (c1): a monomer having no polyfluoroalkyl group and having a blocked isocyanate group which is at least one monomer selected from the group consisting of a 3,5-dimethylpyrazole adduct of 2-isocyanatoethyl (meth)acrylate and 3-(2-butanoneoxime) isocyanatomethyl-3,5,5-trimethylcyclohexyl(2-hydroxyethylmethacrylate)cyanate;

monomer (c2): a monomer having no polyfluoroalkyl group and having at least two polymerizable unsaturated groups (excluding monomer (c1))

which is at least one monomer selected from the group consisting of allyl (meth)acrylate, propylene glycol di(meth)acrylate, diethylene glycol di(meth)acrylate, dipropylene glycol di(meth)acrylate, polypropylene glycol di(meth)acrylate, polyoxypropylene glycol di(meth)acrylate, trimethylolpropane tri(meth)acrylate, pentaerythritol tri(meth)acrylate, pentaerythritol tetra (meth)acrylate, ditrimethylolpropane tetra(meth)acrylate, dipentaerythritol hexa(meth)acrylate, tri(meth)allyl isocyanurate, triallyl cyanurate and phenylglycidylethylacrylate tolylenediisocyanate.

2. The water/oil repellent composition according to claim 1, wherein the monomer (b) is stearyl (meth)acrylate.

3. The water/oil repellent composition according to claim 1, wherein the monomer (c2) is tri(meth)allyl isocyanurate, triallyl cyanurate or phenylglycidylethylacrylate tolyl enediisocyanate.

4. The water/oil repellent composition according to claim 1, wherein the compound of the formula (1) is one wherein Z is a $C_{1-6}$ perfluoroalkyl group, Y is a $C_{1-4}$ alkylene group, n is 1, and X is a group of the formula (3-3).

5. The water/oil repellent composition according to claim 1, wherein the compound of the formula (1) is a methacrylate having a $C_{4-6}$ perfluoroalkyl group.

6. The water/oil repellent composition according to claim 1, wherein a mass ratio of monomer (c1) to monomer (c2) is 1/40 to 40/1.

7. The water/oil repellent composition according to claim 1, wherein monomer (c1) comprises a 3,5-dimethylpyrazole adduct of 2-isocyanatoethyl(meth)acrylate and monomer (c2) comprises triallyl cyanurate.

8. The water/oil repellent composition according to claim 1, wherein a proportion of polymerized unites derived from monomer (c) is 0.1 to 8 mass %.

9. The water/oil repellent composition according to claim 1, wherein a proportion of polymerized units derived from monomer (b) is 35 to 58 mass %.

10. The water/oil repellent composition according to claim 1, wherein said copolymer is in the form of dispersed particles in a medium.

11. The water/oil repellent composition according to claim 10, wherein an average particle size of said copolymer particles is from 10 to 1,000 nm.

12. The water/oil repellent composition according to claim 10, wherein an average particle size of said copolymer particles is from 10 to 200 nm.

13. The water/oil repellent composition according to claim 1, wherein a solid content concentration of said water/oil repellent composition is from 0.2 to 5 mass %.

14. An article treated with the water/oil repellent composition as defined in claim 1.

15. A method for producing a water/oil repellent composition according to claim 1, which comprises polymerizing a monomer mixture comprising from 40 to 60 mass % of the following monomer (a), from 25 to 59.9 mass % of the following monomer (b) and from 0.1 to 15 mass % of a combination of the following monomer (c1) and the following monomer (c2) in a medium in the presence of a surfactant and a polymerization initiator:

monomer (a): a compound of the following formula (1):

$$(Z-Y)_n X \quad (1)$$

wherein Z is a $C_{1-6}$ perfluoroalkyl group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2;

$$C_i F_{2i+1} O(CFX^1 CF_2 O)_j CFX^2— \quad (2)$$

wherein i is an integer of from 1 to 6, j is an integer of from 0 to 10, and each of $X^1$ and $X^2$ which are independent of each other, is a fluorine atom or a trifluoromethyl group;

—CR=CH$_2$ (3-1)

—COOCR=CH$_2$ (3-2)

—OCOCR=CH$_2$ (3-3)

—OCH$_2$-φ-CR=CH$_2$ (3-4)

—OCH=CH$_2$ (3-5)

wherein R is a hydrogen atom, a methyl group or a halogen atom, and φ represents a phenylene group;

—CH[—(CH$_2$)$_m$CR=CH$_2$]— (4-1)

—CH[—(CH$_2$)$_m$COOCR=CH$_2$]— (4-2)

—CH[—(CH$_2$)$_m$OCOCR=CH$_2$]— (4-3)

—OCOCH=CHCOO— (4-4)

wherein R is a hydrogen atom, a methyl group or a halogen atom, and m is an integer of from 0 to 4;

monomer (b): a (meth)acrylate having no polyfluoroalkyl group and having a $C_{12-18}$ alkyl group; and a combination of the following monomer (c1) and the following monomer (c2):

monomer (c1): a monomer having no polyfluoroalkyl group and having a blocked isocyanate group which is at least one monomer selected from the group consisting of a 3,5-dimethylpyrazole adduct of 2-isocyanatoethyl (meth)acrylate and 3-(2-butanoneoxime) isocyanatomethyl-3,5,5-trimethylcyclohexyl(2-hydroxyethylmethacrylate)cyanate;

monomer (c2): a monomer having no polyfluoroalkyl group and having at least two polymerizable unsaturated groups (excluding monomer (c1))

which is at least one monomer selected from the group consisting of allyl (meth)acrylate, propylene glycol di(meth)acrylate, diethylene glycol di(meth)acrylate, dipropylene glycol di(meth)acrylate, polypropylene glycol di(meth)acrylate, polyoxypropylene glycol di(meth)acrylate, trimethylolpropane tri(meth)acrylate, pentaerythritol tri(meth)acrylate, pentaerythritol tetra(meth)acrylate, ditrimethylolpropane tetra(meth)acrylate, dipentaerythritol hexa(meth)acrylate, tri(meth)allyl isocyanurate, triallyl cyanurate and phenylglycidylethylacrylate tolylenediisocyanate.

16. The method for producing a water/oil repellent composition according to claim 15, wherein the compound of the formula (1) is one wherein Z is a $C_{1-6}$ perfluoroalkyl group, Y is a $C_{1-4}$ alkylene group, n is 1, and X is a group of the formula (3-3).

17. The method for producing a water/oil repellent composition according to claim 15, wherein a nonionic surfactant and a cationic surfactant are used in combination as the surfactant.

* * * * *